(12) United States Patent
Rihn et al.

(10) Patent No.: US 8,964,379 B2
(45) Date of Patent: Feb. 24, 2015

(54) SWITCHABLE MAGNETIC LOCK

(75) Inventors: Bernard K. Rihn, Snohomish, WA (US); Paul Henry Dietz, Redmond, WA (US); Steven Nabil Bathiche, Kirkland, WA (US); Joseph B. Gault, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 247 days.

(21) Appl. No.: 13/589,773

(22) Filed: Aug. 20, 2012

(65) Prior Publication Data

US 2014/0049894 A1 Feb. 20, 2014

(51) Int. Cl.
*G06F 1/16* (2006.01)
*G06F 3/033* (2013.01)
*H01F 7/02* (2006.01)

(52) U.S. Cl.
USPC ............... 361/679.56; 345/179; 335/288

(58) Field of Classification Search
USPC ............... 361/679.56; 345/179; 335/288
See application file for complete search history.

(56) References Cited

U.S. PATENT DOCUMENTS

| 4,046,975 | A | | 9/1977 | Seeger, Jr. | |
|---|---|---|---|---|---|
| 4,065,649 | A | | 12/1977 | Carter et al. | |
| 4,237,347 | A | * | 12/1980 | Burundukov et al. | 369/136 |
| 4,243,861 | A | | 1/1981 | Strandwitz | |
| 4,302,648 | A | | 11/1981 | Sado et al. | |
| 4,317,013 | A | | 2/1982 | Larson | |
| 4,365,130 | A | | 12/1982 | Christensen | |
| 4,492,829 | A | | 1/1985 | Rodrique | |
| 4,527,021 | A | | 7/1985 | Morikawa et al. | |
| 4,559,426 | A | | 12/1985 | Van Zeeland et al. | |
| 4,588,187 | A | | 5/1986 | Dell | |
| 4,607,147 | A | | 8/1986 | Ono et al. | |
| 4,643,604 | A | * | 2/1987 | Enrico | 401/131 |
| 4,651,133 | A | | 3/1987 | Ganesan et al. | |
| 5,067,573 | A | * | 11/1991 | Uchida | 345/173 |
| 5,220,521 | A | | 6/1993 | Kikinis | |
| 5,283,559 | A | | 2/1994 | Kalendra et al. | |
| 5,331,443 | A | | 7/1994 | Stanisci | |
| 5,548,477 | A | | 8/1996 | Kumar et al. | |
| 5,558,577 | A | | 9/1996 | Kato | |
| 5,618,232 | A | | 4/1997 | Martin | |
| 5,681,220 | A | | 10/1997 | Bertram et al. | |
| 5,745,376 | A | | 4/1998 | Barker et al. | |
| 5,748,114 | A | | 5/1998 | Koehn | |

(Continued)

FOREIGN PATENT DOCUMENTS

| EP | 1425763 | 6/2004 |
|---|---|---|
| EP | 2353978 | 8/2011 |

(Continued)

OTHER PUBLICATIONS

"Accessing Device Sensors", retrieved from <https://developer.palm.com/content/api/dev-guide/pdk/accessing-device-sensors.html> on May 25, 2012, 4 pages.

(Continued)

*Primary Examiner* — Adrian S Wilson
(74) *Attorney, Agent, or Firm* — Jeremy Snodgrass; Judy Yee; Micky Minhas

(57) ABSTRACT

This document describes techniques using, and apparatuses including, switchable magnetic locks. These techniques and apparatuses can enable low or no power consumption and a seamless design for locking and unlocking of devices one to the other, such as computing devices and peripherals.

8 Claims, 8 Drawing Sheets

(56) References Cited

U.S. PATENT DOCUMENTS

| | | | |
|---|---|---|---|
| 5,750,939 A * | 5/1998 | Makinwa et al. | 178/18.01 |
| 5,781,406 A | 7/1998 | Hunte | |
| 5,807,175 A | 9/1998 | Davis et al. | |
| 5,818,361 A | 10/1998 | Acevedo | |
| 5,828,770 A | 10/1998 | Leis et al. | |
| 5,850,135 A | 12/1998 | Kuki et al. | |
| 5,874,697 A | 2/1999 | Selker et al. | |
| 5,926,170 A | 7/1999 | Oba | |
| 5,971,635 A | 10/1999 | Wise | |
| 5,973,677 A * | 10/1999 | Gibbons | 345/179 |
| 6,002,389 A | 12/1999 | Kasser | |
| 6,005,209 A | 12/1999 | Burleson et al. | |
| 6,012,714 A | 1/2000 | Worley et al. | |
| 6,040,823 A | 3/2000 | Seffernick et al. | |
| 6,044,717 A | 4/2000 | Biegelsen et al. | |
| 6,061,644 A | 5/2000 | Leis | |
| 6,112,797 A | 9/2000 | Colson et al. | |
| 6,178,443 B1 | 1/2001 | Lin | |
| 6,254,105 B1 | 7/2001 | Rinde et al. | |
| 6,279,060 B1 | 8/2001 | Luke et al. | |
| 6,329,617 B1 | 12/2001 | Burgess | |
| 6,344,791 B1 | 2/2002 | Armstrong | |
| 6,366,440 B1 | 4/2002 | Kung | |
| 6,380,497 B1 | 4/2002 | Hashimoto et al. | |
| 6,437,682 B1 | 8/2002 | Vance | |
| 6,511,378 B1 | 1/2003 | Bhatt et al. | |
| 6,532,147 B1 | 3/2003 | Christ, Jr. | |
| 6,543,949 B1 | 4/2003 | Ritchey et al. | |
| 6,545,577 B2 * | 4/2003 | Yap | 335/205 |
| 6,565,439 B2 | 5/2003 | Shinohara et al. | |
| 6,600,121 B1 | 7/2003 | Olodort et al. | |
| 6,603,408 B1 | 8/2003 | Gaba | |
| 6,617,536 B2 | 9/2003 | Kawaguchi | |
| 6,681,333 B1 * | 1/2004 | Cho | 713/300 |
| 6,685,369 B2 | 2/2004 | Lien | |
| 6,704,864 B1 | 3/2004 | Philyaw | |
| 6,721,019 B2 | 4/2004 | Kono et al. | |
| 6,725,318 B1 | 4/2004 | Sherman et al. | |
| 6,774,888 B1 | 8/2004 | Genduso | |
| 6,776,546 B2 | 8/2004 | Kraus et al. | |
| 6,781,819 B2 | 8/2004 | Yang et al. | |
| 6,784,869 B1 | 8/2004 | Clark et al. | |
| 6,813,143 B2 | 11/2004 | Makela | |
| 6,819,082 B2 | 11/2004 | Yang | |
| 6,819,316 B2 | 11/2004 | Schulz et al. | |
| 6,856,506 B2 | 2/2005 | Doherty et al. | |
| 6,861,961 B2 | 3/2005 | Sandbach et al. | |
| 6,898,315 B2 | 5/2005 | Guha | |
| 6,902,214 B2 | 6/2005 | Smith | |
| 6,914,197 B2 | 7/2005 | Doherty et al. | |
| 6,922,333 B2 * | 7/2005 | Weng et al. | 361/679.2 |
| 6,929,291 B2 * | 8/2005 | Chen | 292/251.5 |
| 6,950,950 B2 | 9/2005 | Sawyers et al. | |
| 6,970,957 B1 | 11/2005 | Oshins et al. | |
| 6,976,799 B2 | 12/2005 | Kim et al. | |
| 7,019,491 B2 | 3/2006 | Bozzone et al. | |
| 7,023,430 B2 * | 4/2006 | Liu et al. | 345/179 |
| 7,051,149 B2 | 5/2006 | Wang et al. | |
| 7,083,295 B1 | 8/2006 | Hanna | |
| 7,091,436 B2 | 8/2006 | Serban | |
| 7,106,222 B2 | 9/2006 | Ward et al. | |
| 7,123,292 B1 | 10/2006 | Seeger et al. | |
| 7,194,662 B2 | 3/2007 | Do et al. | |
| 7,199,554 B2 | 4/2007 | Kim et al. | |
| 7,213,991 B2 | 5/2007 | Chapman et al. | |
| 7,277,087 B2 | 10/2007 | Hill et al. | |
| 7,287,738 B2 * | 10/2007 | Pitlor | 248/544 |
| 7,447,934 B2 | 11/2008 | Dasari et al. | |
| 7,457,108 B2 | 11/2008 | Ghosh | |
| 7,469,386 B2 | 12/2008 | Bear et al. | |
| 7,499,037 B2 | 3/2009 | Lube | |
| 7,502,803 B2 | 3/2009 | Culter et al. | |
| 7,542,052 B2 | 6/2009 | Solomon et al. | |
| 7,558,594 B2 | 7/2009 | Wilson | |
| 7,559,834 B1 | 7/2009 | York | |
| 7,626,582 B1 * | 12/2009 | Nicolas et al. | 345/204 |
| 7,636,921 B2 | 12/2009 | Louie | |
| 7,656,392 B2 | 2/2010 | Bolender | |
| 7,705,558 B2 | 4/2010 | Silverman | |
| 7,715,187 B2 | 5/2010 | Hotelling et al. | |
| 7,733,326 B1 | 6/2010 | Adiseshan | |
| 7,773,076 B2 | 8/2010 | Pittel et al. | |
| 7,775,567 B2 * | 8/2010 | Ligtenberg et al. | 292/251.5 |
| 7,777,972 B1 | 8/2010 | Chen et al. | |
| 7,782,342 B2 | 8/2010 | Koh | |
| 7,788,474 B2 | 8/2010 | Switzer et al. | |
| 7,813,715 B2 | 10/2010 | McKillop et al. | |
| 7,822,338 B2 | 10/2010 | Wernersson | |
| 7,852,621 B2 * | 12/2010 | Lin et al. | 361/679.02 |
| 7,884,807 B2 | 2/2011 | Hovden et al. | |
| D636,397 S | 4/2011 | Green | |
| 7,928,964 B2 | 4/2011 | Kolmykov-Zotov et al. | |
| 7,945,717 B2 | 5/2011 | Rivalsi | |
| 7,973,771 B2 | 7/2011 | Geaghan | |
| 7,978,281 B2 | 7/2011 | Vergith et al. | |
| 8,053,688 B2 | 11/2011 | Conzola et al. | |
| 8,059,391 B2 * | 11/2011 | Chang et al. | 361/679.08 |
| 8,065,624 B2 | 11/2011 | Morin et al. | |
| 8,069,356 B2 | 11/2011 | Rathi et al. | |
| 8,130,203 B2 | 3/2012 | Westerman | |
| 8,154,524 B2 | 4/2012 | Wilson et al. | |
| D659,139 S | 5/2012 | Gengler | |
| 8,169,185 B2 | 5/2012 | Partovi et al. | |
| 8,169,421 B2 | 5/2012 | Wright et al. | |
| 8,223,489 B2 * | 7/2012 | Shih | 361/679.58 |
| 8,229,509 B2 | 7/2012 | Paek et al. | |
| 8,229,522 B2 | 7/2012 | Kim et al. | |
| 8,259,091 B2 * | 9/2012 | Yeh | 345/179 |
| 8,264,310 B2 | 9/2012 | Lauder et al. | |
| 8,279,589 B2 | 10/2012 | Kim | |
| 8,497,657 B2 | 7/2013 | Franks et al. | |
| 8,515,501 B2 * | 8/2013 | Lee et al. | 455/575.1 |
| 8,560,004 B1 | 10/2013 | Tsvetkov et al. | |
| 8,571,539 B1 | 10/2013 | Ranganathan et al. | |
| 8,599,542 B1 | 12/2013 | Healey et al. | |
| 8,600,120 B2 | 12/2013 | Gonion et al. | |
| 8,600,526 B2 | 12/2013 | Nielsen et al. | |
| 8,699,215 B2 | 4/2014 | Whitt, III et al. | |
| 8,700,931 B2 | 4/2014 | Gudlavenkatasiva et al. | |
| 8,705,229 B2 * | 4/2014 | Ashcraft et al. | 361/679.27 |
| 8,723,842 B2 * | 5/2014 | Kaneda et al. | 345/179 |
| 8,724,302 B2 | 5/2014 | Whitt et al. | |
| 8,738,090 B2 | 5/2014 | Kanda | |
| 8,854,799 B2 | 10/2014 | Whitt, III et al. | |
| 8,873,227 B2 | 10/2014 | Whitt, III et al. | |
| 2001/0020455 A1 * | 9/2001 | Schifferl | 123/90.11 |
| 2002/0103616 A1 * | 8/2002 | Park et al. | 702/150 |
| 2002/0134828 A1 | 9/2002 | Sandbach et al. | |
| 2002/0138772 A1 | 9/2002 | Crawford et al. | |
| 2002/0163510 A1 | 11/2002 | Williams et al. | |
| 2002/0190823 A1 * | 12/2002 | Yap | 335/205 |
| 2003/0148740 A1 | 8/2003 | Yau et al. | |
| 2003/0197687 A1 | 10/2003 | Shetter | |
| 2004/0258924 A1 | 12/2004 | Berger et al. | |
| 2004/0268000 A1 | 12/2004 | Barker et al. | |
| 2005/0057515 A1 | 3/2005 | Bathiche | |
| 2005/0059489 A1 | 3/2005 | Kim | |
| 2005/0134717 A1 | 6/2005 | Misawa | |
| 2005/0146512 A1 | 7/2005 | Hill et al. | |
| 2005/0231156 A1 | 10/2005 | Yan | |
| 2005/0236848 A1 | 10/2005 | Kim et al. | |
| 2005/0264653 A1 | 12/2005 | Starkweather et al. | |
| 2005/0264988 A1 | 12/2005 | Nicolosi | |
| 2005/0265035 A1 | 12/2005 | Brass et al. | |
| 2005/0285703 A1 | 12/2005 | Wheeler et al. | |
| 2006/0070384 A1 | 4/2006 | Ertel | |
| 2006/0085658 A1 | 4/2006 | Allen et al. | |
| 2006/0125799 A1 | 6/2006 | Hillis et al. | |
| 2006/0154725 A1 | 7/2006 | Glaser et al. | |
| 2006/0156415 A1 | 7/2006 | Rubinstein et al. | |
| 2006/0181514 A1 | 8/2006 | Newman | |
| 2006/0195522 A1 | 8/2006 | Miyazaki | |
| 2006/0261778 A1 | 11/2006 | Elizalde Rodarte | |
| 2007/0062089 A1 | 3/2007 | Homer et al. | |

(56) References Cited

U.S. PATENT DOCUMENTS

| | | |
|---|---|---|
| 2007/0072474 A1 | 3/2007 | Beasley et al. |
| 2007/0114967 A1 | 5/2007 | Peng |
| 2007/0126393 A1 | 6/2007 | Bersenev |
| 2007/0133156 A1* | 6/2007 | Ligtenberg et al. ............ 361/681 |
| 2007/0182663 A1 | 8/2007 | Biech |
| 2007/0188478 A1 | 8/2007 | Silverstein et al. |
| 2007/0194752 A1 | 8/2007 | McBurney |
| 2007/0234420 A1 | 10/2007 | Novotney et al. |
| 2007/0236408 A1 | 10/2007 | Yamaguchi et al. |
| 2007/0236467 A1* | 10/2007 | Marshall et al. ............... 345/173 |
| 2007/0247432 A1 | 10/2007 | Oakley |
| 2007/0247800 A1 | 10/2007 | Smith et al. |
| 2007/0260892 A1 | 11/2007 | Paul et al. |
| 2007/0271527 A1 | 11/2007 | Paas et al. |
| 2007/0283179 A1 | 12/2007 | Burnett et al. |
| 2008/0002350 A1 | 1/2008 | Farrugia |
| 2008/0005423 A1 | 1/2008 | Jacobs et al. |
| 2008/0048654 A1* | 2/2008 | Takahashi et al. ........ 324/207.25 |
| 2008/0061565 A1* | 3/2008 | Lee et al. ................... 292/251.5 |
| 2008/0090626 A1 | 4/2008 | Griffin et al. |
| 2008/0104437 A1 | 5/2008 | Lee |
| 2008/0111518 A1 | 5/2008 | Toya |
| 2008/0151478 A1 | 6/2008 | Chern |
| 2008/0158185 A1 | 7/2008 | Westerman |
| 2008/0186683 A1* | 8/2008 | Ligtenberg et al. ............ 361/726 |
| 2008/0238884 A1 | 10/2008 | Harish |
| 2008/0253822 A1 | 10/2008 | Matias |
| 2008/0258679 A1 | 10/2008 | Manico et al. |
| 2008/0303479 A1 | 12/2008 | Park et al. |
| 2008/0316002 A1 | 12/2008 | Brunet et al. |
| 2008/0320190 A1 | 12/2008 | Lydon et al. |
| 2009/0009476 A1 | 1/2009 | Daley, III |
| 2009/0013275 A1 | 1/2009 | May et al. |
| 2009/0073957 A1 | 3/2009 | Newland et al. |
| 2009/0102419 A1 | 4/2009 | Gwon et al. |
| 2009/0134838 A1 | 5/2009 | Raghuprasad |
| 2009/0140985 A1 | 6/2009 | Liu |
| 2009/0167728 A1 | 7/2009 | Geaghan et al. |
| 2009/0251008 A1 | 10/2009 | Sugaya |
| 2009/0262492 A1 | 10/2009 | Whitchurch et al. |
| 2009/0268386 A1* | 10/2009 | Lin .......................... 361/679.02 |
| 2009/0303204 A1 | 12/2009 | Nasiri et al. |
| 2009/0320244 A1 | 12/2009 | Lin |
| 2009/0321490 A1 | 12/2009 | Groene et al. |
| 2009/0322278 A1 | 12/2009 | Franks et al. |
| 2010/0026656 A1 | 2/2010 | Hotelling et al. |
| 2010/0038821 A1 | 2/2010 | Jenkins et al. |
| 2010/0045609 A1 | 2/2010 | Do et al. |
| 2010/0045633 A1 | 2/2010 | Gettemy |
| 2010/0051356 A1 | 3/2010 | Stern et al. |
| 2010/0051432 A1 | 3/2010 | Lin et al. |
| 2010/0053534 A1 | 3/2010 | Hsieh et al. |
| 2010/0077237 A1 | 3/2010 | Sawyers |
| 2010/0081377 A1 | 4/2010 | Chatterjee et al. |
| 2010/0085321 A1 | 4/2010 | Pundsack |
| 2010/0103112 A1 | 4/2010 | Yoo et al. |
| 2010/0149111 A1 | 6/2010 | Olien |
| 2010/0149134 A1 | 6/2010 | Westerman et al. |
| 2010/0149377 A1 | 6/2010 | Shintani et al. |
| 2010/0156798 A1 | 6/2010 | Archer |
| 2010/0161522 A1 | 6/2010 | Tirpak et al. |
| 2010/0164857 A1 | 7/2010 | Liu et al. |
| 2010/0171891 A1 | 7/2010 | Kaji et al. |
| 2010/0174421 A1 | 7/2010 | Tsai et al. |
| 2010/0180063 A1 | 7/2010 | Ananny et al. |
| 2010/0188299 A1 | 7/2010 | Rinehart et al. |
| 2010/0206614 A1 | 8/2010 | Park et al. |
| 2010/0214214 A1 | 8/2010 | Corson et al. |
| 2010/0214257 A1 | 8/2010 | Wussler et al. |
| 2010/0222110 A1 | 9/2010 | Kim et al. |
| 2010/0237970 A1 | 9/2010 | Liu |
| 2010/0238620 A1 | 9/2010 | Fish |
| 2010/0250988 A1 | 9/2010 | Okuda et al. |
| 2010/0271771 A1 | 10/2010 | Wu et al. |
| 2010/0274932 A1 | 10/2010 | Kose |
| 2010/0279768 A1 | 11/2010 | Huang et al. |
| 2010/0289457 A1 | 11/2010 | Onnerud et al. |
| 2010/0295812 A1 | 11/2010 | Burns et al. |
| 2010/0302378 A1 | 12/2010 | Marks et al. |
| 2010/0304793 A1 | 12/2010 | Kim et al. |
| 2010/0306538 A1 | 12/2010 | Thomas et al. |
| 2010/0308778 A1 | 12/2010 | Yamazaki et al. |
| 2010/0308844 A1 | 12/2010 | Day et al. |
| 2010/0315348 A1 | 12/2010 | Jellicoe et al. |
| 2010/0321877 A1 | 12/2010 | Moser |
| 2010/0325155 A1 | 12/2010 | Skinner et al. |
| 2010/0331059 A1 | 12/2010 | Apgar et al. |
| 2011/0012873 A1 | 1/2011 | Prest et al. |
| 2011/0019123 A1 | 1/2011 | Prest et al. |
| 2011/0031287 A1 | 2/2011 | Le Gette et al. |
| 2011/0037721 A1 | 2/2011 | Cranfill et al. |
| 2011/0043990 A1 | 2/2011 | Mickey et al. |
| 2011/0060926 A1 | 3/2011 | Brooks et al. |
| 2011/0069148 A1 | 3/2011 | Jones et al. |
| 2011/0074688 A1 | 3/2011 | Hull et al. |
| 2011/0102326 A1 | 5/2011 | Casparian et al. |
| 2011/0102356 A1 | 5/2011 | Kemppinen et al. |
| 2011/0134032 A1 | 6/2011 | Chiu et al. |
| 2011/0163955 A1 | 7/2011 | Nasiri et al. |
| 2011/0164370 A1 | 7/2011 | McClure et al. |
| 2011/0167181 A1 | 7/2011 | Minoo et al. |
| 2011/0167287 A1 | 7/2011 | Walsh et al. |
| 2011/0167391 A1 | 7/2011 | Momeyer et al. |
| 2011/0167992 A1 | 7/2011 | Eventoff et al. |
| 2011/0176035 A1 | 7/2011 | Poulsen |
| 2011/0179864 A1 | 7/2011 | Raasch et al. |
| 2011/0184646 A1 | 7/2011 | Wong et al. |
| 2011/0193787 A1 | 8/2011 | Morishige et al. |
| 2011/0205372 A1 | 8/2011 | Miramontes |
| 2011/0227913 A1 | 9/2011 | Hyndman |
| 2011/0248920 A1 | 10/2011 | Larsen |
| 2011/0290686 A1 | 12/2011 | Huang |
| 2011/0297566 A1 | 12/2011 | Gallagher et al. |
| 2011/0304577 A1 | 12/2011 | Brown et al. |
| 2011/0316807 A1 | 12/2011 | Corrion |
| 2012/0007821 A1 | 1/2012 | Zaliva |
| 2012/0023459 A1 | 1/2012 | Westerman |
| 2012/0024682 A1 | 2/2012 | Huang et al. |
| 2012/0044179 A1 | 2/2012 | Hudson |
| 2012/0047368 A1 | 2/2012 | Chinn et al. |
| 2012/0050975 A1 | 3/2012 | Garelli et al. |
| 2012/0075249 A1 | 3/2012 | Hoch |
| 2012/0092279 A1 | 4/2012 | Martin |
| 2012/0094257 A1 | 4/2012 | Pillischer et al. |
| 2012/0099749 A1 | 4/2012 | Rubin et al. |
| 2012/0117409 A1 | 5/2012 | Lee et al. |
| 2012/0127118 A1 | 5/2012 | Nolting et al. |
| 2012/0140396 A1 | 6/2012 | Zeliff et al. |
| 2012/0145525 A1 | 6/2012 | Ishikawa |
| 2012/0162693 A1 | 6/2012 | Ito |
| 2012/0182242 A1 | 7/2012 | Lindahl et al. |
| 2012/0185803 A1 | 7/2012 | Wang et al. |
| 2012/0194448 A1 | 8/2012 | Rothkopf |
| 2012/0224073 A1 | 9/2012 | Miyahara |
| 2012/0235790 A1 | 9/2012 | Zhao et al. |
| 2012/0246377 A1 | 9/2012 | Bhesania |
| 2012/0256959 A1 | 10/2012 | Ye et al. |
| 2012/0274811 A1 | 11/2012 | Bakin |
| 2012/0278744 A1 | 11/2012 | Kozitsyn et al. |
| 2012/0284297 A1 | 11/2012 | Aguera-Arcas et al. |
| 2012/0300275 A1 | 11/2012 | Vilardell et al. |
| 2012/0323933 A1 | 12/2012 | He et al. |
| 2013/0009413 A1 | 1/2013 | Chiu et al. |
| 2013/0027867 A1 | 1/2013 | Lauder et al. |
| 2013/0063873 A1 | 3/2013 | Wodrich et al. |
| 2013/0083466 A1 | 4/2013 | Becze et al. |
| 2013/0187753 A1 | 7/2013 | Chiriyankandath |
| 2013/0207937 A1 | 8/2013 | Lutian |
| 2013/0229354 A1 | 9/2013 | Whitt, III |
| 2013/0229756 A1 | 9/2013 | Whitt, III |
| 2013/0229757 A1 | 9/2013 | Whitt, III |
| 2013/0283212 A1 | 10/2013 | Zhu et al. |
| 2013/0301199 A1 | 11/2013 | Whitt |
| 2013/0329360 A1 | 12/2013 | Aldana |

(56) References Cited

U.S. PATENT DOCUMENTS

| | | | |
|---|---|---|---|
| 2014/0053108 | A1 | 2/2014 | Johansson |
| 2014/0123273 | A1 | 5/2014 | Matus |
| 2014/0185215 | A1 | 7/2014 | Whitt |
| 2014/0185220 | A1 | 7/2014 | Whitt |
| 2014/0362506 | A1 | 12/2014 | Whitt, III et al. |

FOREIGN PATENT DOCUMENTS

| | | |
|---|---|---|
| EP | 2618247 | 7/2013 |
| JP | 10326124 | 12/1998 |
| JP | 1173239 | 3/1999 |
| KR | 20080006404 | 1/2008 |

OTHER PUBLICATIONS

"ACPI Docking for Windows Operating Systems", Retrieved from: <http://www.scritube.com/limba/engleza/software/ACPI-Docking-for-Windows-Opera331824193.php> on Jul. 6, 2012, 10 pages.

"Cirago Slim Case®—Protective case with built-in kickstand for your iPhone 5®", Retrieved from <http://cirago.com/wordpress/wp-content/uploads/2012/10/ipc15000brochure1.pdf> on Jan. 29, 2013, (Jan. 2013), 1 page.

"DR2PA", retrieved from <http://www.architainment.co.uk/wp-content/uploads/2012/08/DR2PA-AU-US-size-Data-Sheet-Rev-H_LOGO.pdf> on Sep. 17, 2012, 4 pages.

"First One Handed Fabric Keyboard with Bluetooth Wireless Technology", Retrieved from: <http://press.xtvworld.com/article3817.html> on May 8, 2012,(Jan. 6, 2005), 2 pages.

"Force and Position Sensing Resistors: An Emerging Techology", *Interlink Electronics*, Available at <http://staff.science.uva.nl/~vlaander/docu/FSR/An_Exploring_Technology.pdf>,(Feb. 1990), pp. 1-6.

"Frogpad Introduces Weareable Fabric Keyboard with Bluetooth Technology", Retrieved from: <http://www.geekzone.co.nz/content.asp?contentid=3898> on May 7, 2012,(Jan. 7, 2005), 3 pages.

"Incipio LG G-Slate Premium Kickstand Case—Black Nylon", Retrieved from: <http://www.amazon.com/Incipio-G-Slate-Premium-Kickstand-Case/dp/B004ZKP916> on May 8, 2012, 4 pages.

"Membrane Keyboards & Membrane Keypads", Retrieved from: <http://www.pannam.com/> on May 9, 2012,(Mar. 4, 2009), 2 pages.

"Motion Sensors", *Android Developers*, retrieved from <http://developer.android.com/guide/topics/sensors/sensors_motion.html> on May 25, 2012, 7 pages.

"NI Releases New Maschine & Maschine Mikro", Retrieved from <http://www.djbooth.net/index/dj-equipment/entry/ni-releases-new-maschine-mikro/> on Sep. 17, 2012, 19 pages.

"Non-Final Office Action", U.S. Appl. No. 13/471,001, (Feb. 19, 2013), 15 pages.

"Non-Final Office Action", U.S. Appl. No. 13/471,139, (Mar. 21, 2013), 12 pages.

"Non-Final Office Action", U.S. Appl. No. 13/471,202, (Feb. 11, 2013), 10 pages.

"Non-Final Office Action", U.S. Appl. No. 13/471,336, (Jan. 18, 2013), 14 pages.

"Non-Final Office Action", U.S. Appl. No. 13/651,195, (Jan. 2, 2013), 14 pages.

"Non-Final Office Action", U.S. Appl. No. 13/651,232, (Jan. 17, 2013), 15 pages.

"Non-Final Office Action", U.S. Appl. No. 13/651,272, (Feb. 12, 2013), 10 pages.

"Non-Final Office Action", U.S. Appl. No. 13/651,287, (Jan. 29, 2013), 13 pages.

"Non-Final Office Action", U.S. Appl. No. 13/651,304, (Mar. 22, 2013), 9 pages.

"Non-Final Office Action", U.S. Appl. No. 13/651,327, (Mar. 22, 2013), 6 pages.

"Non-Final Office Action", U.S. Appl. No. 13/651,871, (Mar. 18, 2013), 14 pages.

"Non-Final Office Action", U.S. Appl. No. 13/651,976, (Feb. 22, 2013), 16 pages.

"Non-Final Office Action", U.S. Appl. No. 13/653,321, (Feb. 1, 2013), 13 pages.

"Non-Final Office Action", U.S. Appl. No. 13/653,682, (Feb. 7, 2013), 11 pages.

"Notice of Allowance", U.S. Appl. No. 13/470,633, (Mar. 22, 2013), 7 pages.

"Position Sensors", *Android Developers*, retrieved from <http://developer.android.com/guide/topics/sensors/sensors_position.html> on May 25, 2012, 5 pages.

"Restriction Requirement", U.S. Appl. No. 13/471,139, (Jan. 17, 2013), 7 pages.

"Restriction Requirement", U.S. Appl. No. 13/651,304, (Jan. 18, 2013), 7 pages.

"Restriction Requirement", U.S. Appl. No. 13/651,726, (Feb. 22, 2013), 6 pages.

"Restriction Requirement", U.S. Appl. No. 13/651,871, (Feb. 7, 2013), 6 pages.

"SoIRx™ E-Series Multidirectional Phototherapy Expandable™ 2-Bulb Full Body Panel System", Retrieved from: < http://www.solarcsystems.com/us_multidirectional_uv_light_therapy_1_intro.html > on Jul. 25, 2012,(2011), 4 pages.

"The Microsoft Surface Tablets Comes With Impressive Design and Specs", Retrieved from <http://microsofttablereview.com/the-microsoft-surface-tablets-comes-with-impressive-design-and-specs> on Jan. 30, 2013, (Jun. 2012), 2 pages.

"Tilt Shift Lenses: Perspective Control", retrieved from http://www.cambridgeincolour.com/tutorials/tilt-shift-lenses1.htm, (Mar. 28, 2008), 11 Pages.

"Virtualization Getting Started Guide", *Red Hat Enterprise Linux 6, Edition 0.2*, retrieved from <http://docs.redhat.com/docs/en-US/Red_Hat_Enterprise_Linux/6/html-single/Virtualization_Getting_Started_Guide/index.html> on Jun. 13, 2012, 24 pages.

"What is Active Alignment?", http://www.kasalis.com/active_alignment.html, retrieved on Nov. 22, 2012, 2 Pages.

Block, Steve et al., "DeviceOrientation Event Specification", *W3C, Editor's Draft*, retrieved from <https://developer.palm.com/content/api/dev-guide/pdk/accessing-device-sensors.html> on May 25, 2012,(Jul. 12, 2011), 14 pages.

Brown, Rich "Microsoft Shows Off Pressure-Sensitive Keyboard", retrieved from <http://news.cnet.com/8301-17938_105-10304792-1.html> on May 7, 2012, (Aug. 6, 2009), 2 pages.

Butler, Alex et al., "SideSight: Multi-"touch" Interaction around Small Devices", *In the proceedings of the 21st annual ACM symposium on User interface software and technology.*, retrieved from <http://research.microsoft.com/pubs/132534/sidesight_crv3.pdf> on May 29, 2012,(Oct. 19, 2008), 4 pages.

Crider, Michael "Sony Slate Concept Tablet "Grows" a Kickstand", Retrieved from: <http://androidcommunity.com/sony-slate-concept-tablet-grows-a-kickstand-20120116/> on May 4, 2012,(Jan. 16, 2012), 9 pages.

Das, Apurba et al., "Study of Heat Transfer through Multilayer Clothing Assemblies: A Theoretical Predicition", Retrieved from <http://www.autexrj.com/cms/zalaczone_pliki/5_013_11.pdf>, (Jun. 2011), 7 pages.

Dietz, Paul H., et al., "A Practical Pressure Sensitive Computer Keyboard", In Proceedings of UIST 2009,(Oct. 2009), 4 pages.

Glatt, Jeff "Channel and Key Pressure (Aftertouch).", Retrieved from: <http://home.roadrunner.com/~jgglatt/tutr/touch.htm> on Jun. 11, 2012, 2 pages.

Hanlon, Mike "ElekTex Smart Fabric Keyboard Goes Wireless", Retrieved from: <http://www.gizmag.com/go/5048/ > on May 7, 2012,(Jan. 15, 2006), 5 pages.

Kaur, Sukhmani "Vincent Liew's redesigned laptop satisfies ergonomic needs", Retrieved from: <http://www.designbuzz.com/entry/vincent-liew-s-redesigned-laptop-satisfies-ergonomic-needs/> on Jul. 27, 2012,(Jun. 21, 2010), 4 pages.

Khuntontong, Puttachat et al., "Fabrication of Molded Interconnection Devices by Ultrasonic Hot Embossing on Thin Polymer Films", IEEE Transactions on Electronics Packaging Manufacturing, vol. 32, No. 3,(Jul. 2009), pp. 152-156.

(56) References Cited

OTHER PUBLICATIONS

Linderholm, Owen "Logitech Shows Cloth Keyboard for PDAs", Retrieved from: <http://www.pcworld.com/article/89084/logitech_shows_cloth_keyboard_for_pdas.html> on May 7, 2012,(Mar. 15, 2002), 5 pages.
McLellan, Charles "Eleksen Wireless Fabric Keyboard: a first look", Retrieved from: <http://www.zdnetasia.com/eleksen-wireless-fabric-keyboard-a-first-look-40278954.htm> on May 7 2012,(Jul. 17, 2006), 9 pages.
Post, E.R. et al., "E-Broidery: Design and Fabrication of Textile-Based Computing", IBM Systems Journal, vol. 39, Issue 3 & 4,(Jul. 2000), pp. 840-860.
Purcher, Jack "Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html> on Jun. 4, 2012,(Jan. 12, 2012), 15 pages.
Takamatsu, Seiichi et al., "Flexible Fabric Keyboard with Conductive Polymer-Coated Fibers", In Proceedings of Sensors 2011,(Oct. 28, 2011), 4 pages.
Valliath, G T., "Design of Hologram for Brightness Enhancement in Color LCDs", Retrieved from <http://www.loreti.it/Download/PDF/LCD/44_05.pdf> on Sep. 17, 2012, 5 pages.
Williams, Jim "A Fourth Generation of LCD Backlight Technology", Retrieved from <http://cds.linear.com/docs/Application%20Note/an65f.pdf>, (Nov. 1995), 124 pages.
Zhang, et al., "Model-Based Development of Dynamically Adaptive Software", *In Proceedings of ICSE 2006*, Available at <http://www.irisa.fr/lande/lande/icse-proceedings/icse/p371.pdf>,(May 20, 2006), pp. 371-380.
"Non-Final Office Action", U.S. Appl. No. 13/563,435, (Jun. 14, 2013), 6 pages.
"Non-Final Office Action", U.S. Appl. No. 13/564,520, (Jun. 19, 2013), 8 pages.
"Non-Final Office Action", U.S. Appl. No. 13/565,124, (Jun. 17, 2013), 5 pages.
"Non-Final Office Action", Application No. 13/371,725, (Nov. 7, 2013), 19 pages.
"Non-Final Office Action", U.S. Appl. No. 13/780,228, Oct. 30, 2013, 12 pages.
"Corrected Notice of Allowance", U.S. Appl. No. 13/563,435, Jan. 14, 2014, 2 pages.
"Corrected Notice of Allowance", U.S. Appl. No. 13/563,435, Jan. 22, 2014, 2 pages.
"Notice of Allowance", U.S. Appl. No. 13/563,435, Nov. 12, 2013, 5 pages.
"Surface", Retrieved from <http://www.microsoft.com/surface/en-us/support/hardware-and-drivers/type-cover> on Dec. 24, 2013, 6 pages.
"Notice of Allowance", U.S. Appl. No. 13/565,124, Dec. 24, 2013, 6 pages.
"Final Office Action", U.S. Appl. No. 13/564,520, Jan. 15, 2014, 7 pages.
"Corrected Notice of Allowance", U.S. Appl. No. 13/563,435, Mar. 20, 2014, 2 pages.
"Corrected Notice of Allowance", U.S. Appl. No. 13/565,124, Apr. 3, 2014, 4 pages.
"Edwards 1508 Series Surface Wall Mount Electromagnetic Door Holder", Edwards Signaling, retrieved from <http://www.thesignalsource.com/documents/1508.pdf>, 2000, 1 page.
"Final Office Action", U.S. Appl. No. 12/163,614, Nov. 8, 2012, 15 pages.
"Final Office Action", U.S. Appl. No. 12/163,614, Aug. 19, 2011, 15 pages.
"Final Office Action", U.S. Appl. No. 13/371,725, Apr. 2, 2014, 22 pages.
"Final Office Action", U.S. Appl. No. 13/780,228, Mar. 28, 2014, 13 pages.
"Magnetic Cell Phone Holder", Extreme Computing, retrieved from <http://www.extremecomputing.com/magnetholder.html> on May 7, 2008, 1 page.
"Non-Final Office Action", U.S. Appl. No. 12/163,614, Apr. 27, 2011, 15 pages.
"Non-Final Office Action", U.S. Appl. No. 12/163,614, May 24, 2012, 15 pages.
"Non-Final Office Action", U.S. Appl. No. 13/471,237, Mar. 24, 2014, 7 pages.
"Non-Final Office Action", U.S. Appl. No. 13/564,520, Feb. 14, 2014, 5 pages.
"Non-Final Office Action", U.S. Appl. No. 14/199,924, Apr. 10, 2014, 6 pages.
"Non-Final Office Action", U.S. Appl. No. 14/200,595, Apr. 11, 2014, 4 pages.
"Notice of Allowance", U.S. Appl. No. 12/163,614, Apr. 3, 2013, 9 pages.
"Advisory Action", U.S. Appl. No. 14/199,924, May 28, 2014, 2 pages.
"Can I Customize my Samsung Galaxy S® 4 Lock Screen? Which Features can I Access When the Device is Locked?", Retrieved From: <http://www.samsung.com/us/support/howtoguide/N0000006/10632/127767> Jul. 3, 2014, May 16, 2014, 12 Pages.
"Corrected Notice of Allowance", U.S. Appl. No. 13/565,124, Mar. 10, 2014, 2 pages.
"Corrected Notice of Allowance", U.S. Appl. No. 13/565,124, Apr. 14, 2014, 2 pages.
"Final Office Action", U.S. Appl. No. 14/199,924, May 6, 2014, 5 pages.
"Lock Screen Overview (Windows Runtime Apps)", Retrieved From: <http://msdn.microsoft.com/en-in/library/windows/apps/hh779720.aspx> Jul. 8, 2014, Dec. 31, 2012, 5 Pages.
"Non-Final Office Action", U.S. Appl. No. 13/564,520, Jun. 16, 2014, 5 pages.
"Notice of Allowance", U.S. Appl. No. 13/471,237, May 12, 2014, 8 pages.
"Notice of Allowance", U.S. Appl. No. 14/199,924, Jun. 10, 2014, 4 pages.
"Windows 7: Display Reminder When Click on Shutdown?", Retrieved From: < http://www.sevenforums.com/customization/118688-display-reminder-when-click-shutdown.html> Jul. 8, 2014, Oct. 18, 2010, 5 Pages.
Campbell, "Future iPhones May Unlock, Hide Messages based on a User's Face", Retrieved From:<http://appleinsider.com/articles/13/12/03/future-iphones-may-unlock-hide-messages-based-on-a-users-face> Jul. 3, 2014, Dec. 3, 2013, 11 Pages.
Caprio, "Enabling Notification Badges for Whatsapp and Other Android Apps", Retrieved From: <http://geek.ng/2013/05/enabling-notification-badges-for-whatsapp-and-other-android-apps.html> Jul. 3, 2014, May 20, 2014, 7 Pages.
Carlon, "How to Add a WhatsApp Widget to your Lock Screen", Retrieved From: <http://www.androidpit.com/how-to-add-a-whatsapp-widget-to-your-lock-screen> Jul. 3, 2014, Apr. 9, 2014, 6 Pages.
Constine, "Cover is an Android-Only Lockscreen that Shows Apps When You Need Them", Retrieved From: <http://techcrunch.com/2013/10/24/cover-android/> Jul. 2, 2014, Oct. 24, 2013, 15 pages.
Haslam, "This App for Android Customizes your Lock Screen Automatically Depending on Time of Day or Situation", Retrieved From: <http://www.redmondpie.com/this-app-for-android-customizes-your-lock-screen-automatically-depending-on-time-of-day-or-situation/> Jul. 8, 2014, Jun. 1, 2012, 6 Pages.
Henry, "Supercharge Your Lock Screen with DashClock and These Add-Ons", Retrieved From: <http://lifehacker.com/supercharge-your-lock-screen-with-dashclock-and-these-a-493206006> Jul. 3, 2014, May 7, 2013, 12 Pages.
Patterson, "iOS 7 Tip: Alerts, Banners, and Badges—What's the Difference?", Retrieved From: <http://heresthethingblog.com/2014/01/22/ios-7-tip-whats-difference-alert/>, Jan. 22, 2014, 6 Pages.
Ritchie, "How to Use Lock Screen, Today, Popups, and Banners in Notification Center for iPhone and iPad", Retrieved From: <http://www.imore.com/how-use-notification-center-iphone-ipad> Jul. 3, 2014, Apr. 30, 2014, 8 pages.

(56) References Cited

OTHER PUBLICATIONS

Royman, "NiLS Lockscreen Notifications", Retrieved From: <https://play.google.com/store/apps/details?id=com.roymam.android.notificationswidget&hl=en> Jul. 3, 2014, Jun. 28, 2014, 3 Pages.

Salman, "Create a Minimal Lock Screen With WidgetLocker", Retrieved From: <http://android.appstorm.net/how-to/create-a-minimal-lock-screen-with-widgetlocker/> Jul. 3, 2014, Dec. 26, 2011, 12 Pages.

Whitwam, "How to Tweak Android's Lock Screen and Notifications", Retrieved From: <http://www.tested.com/tech/android/457766-tips-and-tricks-make-androids-lock-screen-and-notifications-even-better/?icid=pets%7Chat%7Ctestedlink%7C457766-how-to-tweak-androids-lock-screen-and-notifications> Jul. 3, 2014, Sep. 18, 2013, 4 Pages.

Iwase, Eiji, "Multistep Sequential Batch Assembly of Three-Dimensional Ferromagnetic Microstructures with Elastic Hinges", Retrieved at <<http://ieeexplore.ieee.org/stamp/stamp.jsp?tp=&arnumber=1549861>> Proceedings: Journal of Microelectromechanical Systems, Dec. 2005, pp. 7.

"Controlling Your Desktop's Power Management", Retrieved From: <http://www.vorkon.de/SU1210.001/drittanbieter/Dokumentation/openSUSE_11.2/manual/sec.gnomeuserstart.power_mgmt.html> Jul. 7, 2014, 6 Pages.

"Corrected Notice of Allowance", U.S. Appl. No. 14/199,924, Aug. 29, 2014, 2 pages.

"Corrected Notice of Allowance", U.S. Appl. No. 14/199,924, Sep. 5, 2014, 2 pages.

"Foreign Notice of Allowance", CN Application No. 201320097065.3, Nov. 21, 2013, 2 pages.

"Foreign Office Action", CN Application No. 201320097065.3, Jun. 18, 2013, 2 pages.

"International Search Report and Written Opinion", Application No. PCT/US2013/028481, Jun. 19, 2014, 11 pages.

Eckel, "Personalize Alerts with the Help of OS X Mavericks Notifications", Retrieved From: <http://www.techrepublic.com/article/customize-os-x-mavericks-notifications-to-personalize-alerts/> Jul. 8, 2014, Mar. 10, 2014, 7 Pages.

Mack, "Moto X: The First Two Weeks", Retrieved From: <http://www.gizmag.com/two-weeks-motorola-google-moto-x-review/28722/> Jul. 8, 2014, Aug. 16, 2013, 8 pages.

Thurrott, "Nokia Lumia "Black": Glance 2.0", Retrieved From:<http://winsupersite.com/windows-phone/nokia-lumia-black-glance-20> Jul. 8, 2014, Jan. 11, 2014, 3 Pages.

"Corrected Notice of Allowance", U.S. Appl. No. 14/199,924, Sep. 19, 2014, 2 pages.

"Final Office Action", U.S. Appl. No. 14/200,595, Nov. 19, 2014, 5 pages.

"Non-Final Office Action", U.S. Appl. No. 13/371,725, Nov. 3, 2014, 27 pages.

\* cited by examiner

SWITCHABLE MAGNETIC LOCK

BACKGROUND

Many computing devices have movable and removable parts and peripherals. A smart phone may include a stylus, a laptop a hinged display, a tablet computer a battery charger, or a portable audio player a docking station, to name just a few. Current techniques often fix these parts and peripherals to their computing devices using mechanic connectors, such as latches, sliding tabs, and so forth. These mechanical connectors, however, often fail to provide a satisfactory design because they have objects that jut out or holes that pierce the computer body, part, or peripheral. Examples include exposed latches, latch holes, tabs hooks, and tab reception detents, to name just a few.

Some techniques have attempted to address this failure in design through electromagnets or permanent magnets. Electromagnets, however, are unsatisfactory due to their power requirements and low magnetic force. Current techniques that use permanent magnets do not suitably fix the computing device to the part or peripheral or, if they do, require excessive force to separate the computing device from the part or peripheral.

SUMMARY

This document describes techniques enabling use of switchable magnetic locks and apparatuses including switchable magnetic locks. The techniques and apparatuses can enable computing devices to lock and unlock peripherals and other devices using little or no power and with a seamless design.

This summary is provided to introduce simplified concepts for switchable magnetic locks, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and apparatuses for switchable magnetic locks are described with reference to the following drawings. The same numbers are used throughout the drawings to reference like features and components.

DETAILED DESCRIPTION

Overview

This document describes techniques using, and apparatuses including, switchable magnetic locks. These techniques and apparatuses can enable locking and unlocking of parts and peripherals with low or no power consumption and a seamless design.

Consider, for example, a current laptop computing device having an integrated body and display. The body and the display are connected with a hinge allowing the display to rotate to and from the body. On closing the display to the body, the display is locked to the body with latches. To open the laptop, this locking system typically requires the user to find one or two latch-release slides and then manually operate the slides while pulling the display from the body. Thus, this design may require a user to operate manual controls and includes two latches that jut out from the display, two latch-holes that pierce the body, and latch-release slides that also jut out from either the display or body.

The described techniques and apparatuses, however, enable a switchable magnetic lock to be used. Assume that instead of the above latch locking system, a laptop includes a switchable magnetic lock. In this case, on closing the display to the body, a controller in the laptop senses the proximity of the display to the body, activates an actuator effective to cease a null state of a permanent magnet and instead direct the permanent magnet's magnetic field to a magnetically permeable material in the display. By so doing, the display is drawn to the body and locked to the body. The controller then ceases to use power, as the magnetic circuit does not require power to be maintained.

On opening the laptop, the controller may sense a touch of the user on a portion of the display at which a person is likely to touch when attempting to open the laptop. The controller then activates the actuator effective to null the magnetic field instead of direct it to the display's magnetically permeable material, thereby unlocking the display from the body. The display then easily moves away from the body. The magnetically permeable material can be seamlessly integrated into the display, as can the permanent magnet and actuator into the body. Therefore, instead of two latches and a latch release jutting out and two holes piercing the display or body, there are no jut-outs and no holes. Also, the techniques enable a user to easily open the laptop without operating a manual selector, such as the manual latch-release noted above.

This is but one example of how techniques and/or apparatuses enabling use of switchable magnetic locks can be performed. Techniques and/or apparatuses are referred to herein separately or in conjunction as the "techniques" as permitted by the context. This document now turns to an example environment in which the techniques can be embodied after which two example apparatus having a switchable magnetic lock, various example methods, and an example device are described.

Example Environment

Figure 1:
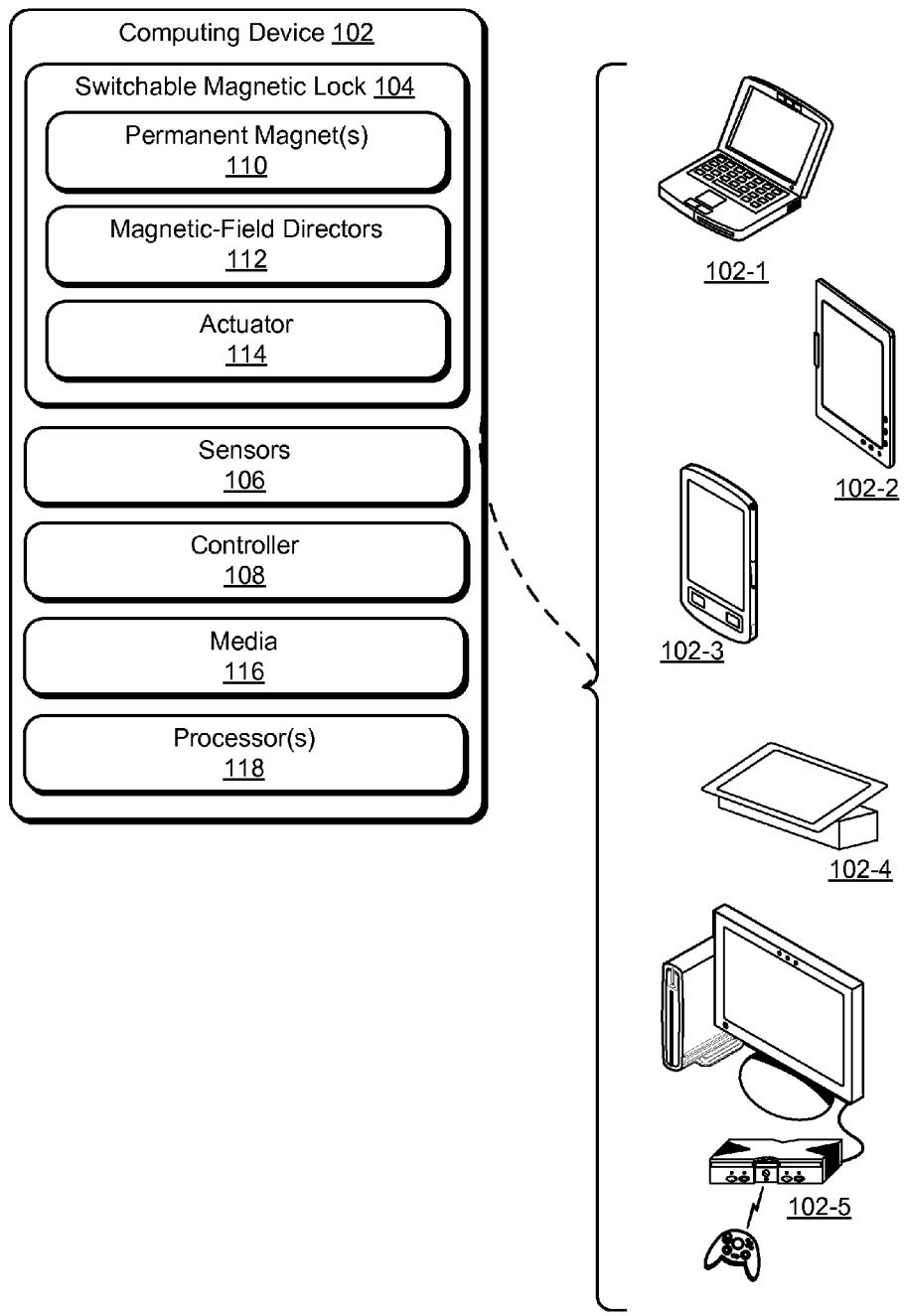
FIG. 1 illustrates an example environment in which a switchable magnetic lock can be implemented.

FIG. 1 is an illustration of an example environment 100 in which techniques using, and an apparatus including, a switchable magnetic lock may be embodied. Environment 100 includes a computing device 102 having a switchable magnetic lock 104, sensors 106, and a controller 108.

Switchable magnetic lock 104 includes a permanent magnet 110 (or magnets), magnetic-field directors 112, and an actuator 114. Permanent magnet 110 is configured such that its magnetic field is capable of being directed. In some embodiments, permanent magnet 110 includes a diametrically magnetized magnet having a magnetic field polarized perpendicular to a long axis of the magnet such that rotating the magnet or field directors surrounding the magnet is effective to direct the magnetic field perpendicular to the long axis. These and other magnets and structures are set forth in greater detail below.

Magnetic-field directors 112 of switchable magnetic lock 104 are configured to direct the magnetic field of permanent magnet 110 to a null state and to a directed state. In the directed state, a magnetic circuit can be completed with a magnetically permeable material of another device (e.g., of a peripheral). These other devices may include various movable and/or removable parts and peripherals, such as cord connectors (e.g., power cords without mechanical retention), styluses, displays, mice, gaming controllers, docking stations, and so forth. When the directed state is completed, the other device is locked to computing device 102. Each of magnetic-field directors 112 may include an isolated magnetic circuit configured to selectably direct the magnetic field as noted. Alternatively or in addition to use of magnetic-field directors 112, switchable magnetic lock 104 may include a magnetic shield material to null or assist in nulling the magnetic field, such as Mu-metal, though this is not required.

Actuator 114 of switchable magnetic lock 104 is configured to move permanent magnet 110 and/or magnetic-field directors 112. Actuator 114 can be powered or unpowered. Thus, actuator 114 may include a simple mechanical device that can be manually operated by a user effective to direct the magnetic field so that switchable magnetic lock 104 locks or unlocks. Alternatively, actuator 114 can be powered and controlled, either manually or by controller 108. In the powered and controlled embodiment, actuator 114 moves permanent magnet 110 and/or field directors 112 effective to direct the magnetic field to a null state or a directed state. Actuator 114 may include various different types of electro-mechanical devices, such as a solenoid or geared vibrator motor.

Note that actuator 114 may be operated without using power in the manual case effective to change the state of switchable magnetic lock 104. Even in the powered case, however, power is not needed to maintain the state of switchable magnetic lock 104, rather, power is used to switch between the states. Switching between states can be done at low power and generally quickly, such that little power is used.

Sensors 106 are capable of sensing a user's interaction with computing device 102 and/or an associated device or peripheral, such as moving a peripheral in proximity with computing device 102, touching computing device 102, and so forth. Sensors 106 may sense actively, passively, and/or responsive to an explicit or implicit selection. In some cases, sensors 106 include a capacitive sensor capable of sensing contact of a user touching computing device 102 or another device having a magnetically permeable material. Alternatively or additionally, sensors 106 may include a magnetic load sensor capable of sensing proximity of a device, such as device having a digitizer or an LC circuit (e.g., an inductor-capacitor circuit capable of sensing a particular signal). In addition to being capable of sensing a user's interaction, sensors 106 may sense a current state of switchable magnetic lock 104, such as with hall-effect sensors.

Controller 108 is capable of controlling actuator 114 effective to lock and unlock switchable magnetic lock 104. For example, in a case where permanent magnet 110 is a diametrically magnetized magnet having a long axis, controller 108 powers actuator 114 to rotate the diametrically magnetized magnet about the long axis from a lock position to an unlock position. Controller 108 acts responsive to input, such as from a sensor indicating a user's implicit or explicit selection to lock or unlock switchable magnetic lock 104. Controller 108 may also receive information indicating a current state of the magnetic field of switchable magnetic lock 104, such as from the above-noted hall-effect sensors.

Controller 108 can be embodied as part of, or separate from, switchable magnetic lock 104. Controller 108 may also be implemented as computer-executable instructions stored on computer-readable storage media 116 (media 116) and executable by one or more processors 118, though this is not required. Alternatively or additionally, controller 108 can be embodied as hardware, firmware, and/or computer-executable instructions as noted above, in whole or in part.

As shown in FIG. 1, computing device 102 can each be one or a combination of various devices, here illustrated with six examples: a laptop computer 102-1, a tablet computer 102-2, a smart phone 102-3, an all-in-one computer 102-4, and a gaming system 102-5, though other computing devices and systems, such as desktop computers, televisions, netbooks, media players, and cellular phones, may also be used.

Example Computing Devices Having a Switchable Magnetic Lock

Figure 2:
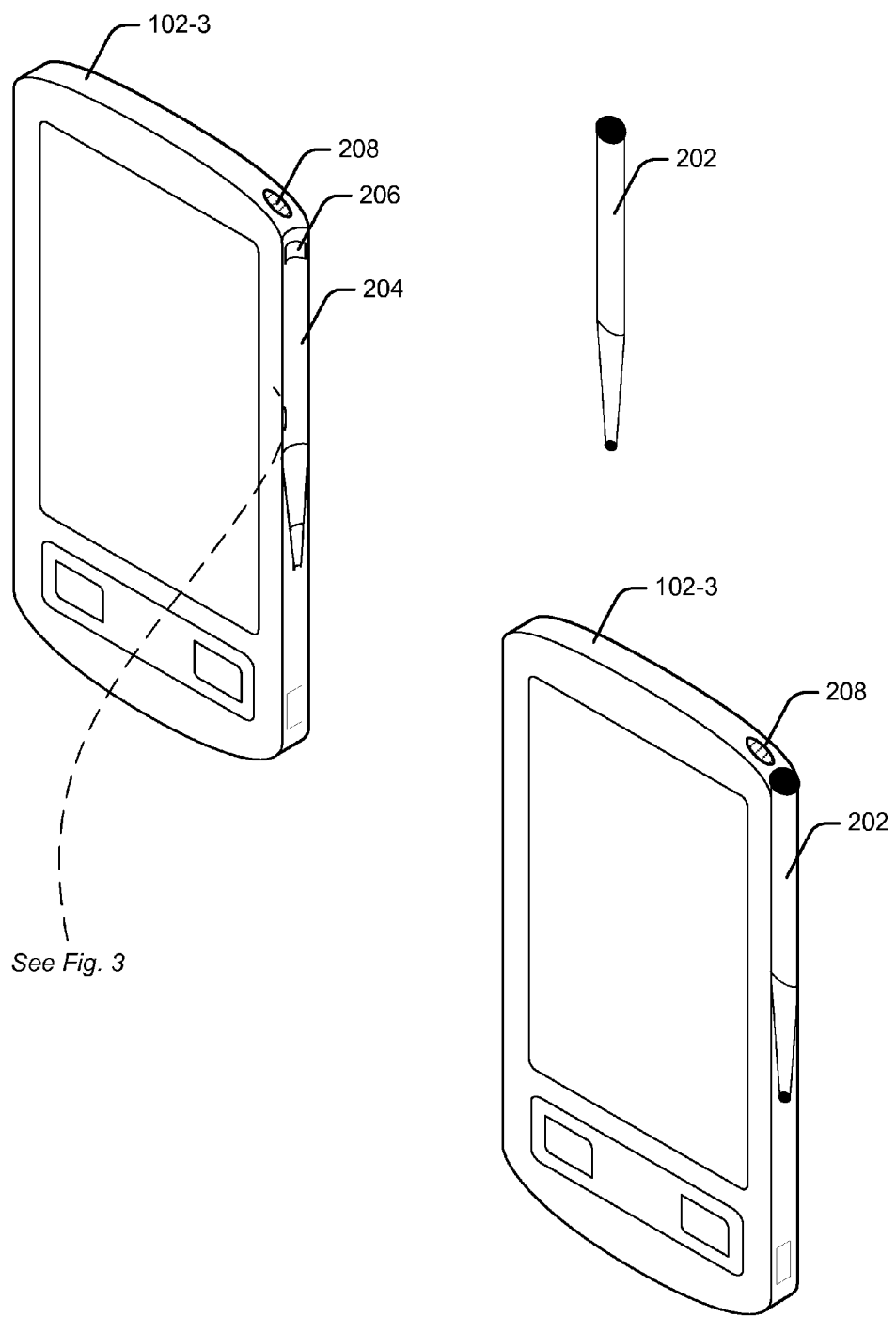
FIG. 2 illustrates an example smart phone having a switchable magnetic lock and a retention structure for a stylus.

FIG. 2 illustrates an example smart phone having a switchable magnetic lock and a retention structure for a stylus. Consider again smart phone 102-3 of FIG. 1, here with a stylus 202 shown attached and unattached. Smart phone 102-3 is illustrated with a retention structure 204, a low-power permanent magnet 206 seamlessly integrated into retention structure 204, and a capacitive sensor 208 integrated seamlessly into an outer surface of smart phone 102-3. Smart phone 102-3 also includes a magnetic load sensor and hall-effect sensors, which are internal to smart phone 102-3 and are not illustrated.

Low-power permanent magnet 206 is shown within retention structure 204, though proximity rather than inclusion is sufficient. Low-power permanent magnet 206 provides another magnetic field in addition to that of the switchable magnetic lock. This other magnetic field has a power substantially less than the power of the magnetic field of the diametrically magnetized magnet. It does not lock stylus 202 to smart phone 102-3 sufficient to prevent accidental removal, but instead retains stylus 202 so that stylus 202 does not fall off when the switchable magnetic lock nulls its more-powerful magnetic field. Other low-force or temporary retention manners may also or instead be used in conjunction with the switchable magnetic lock, though they are not required. Note that nulling the magnetic field includes substantially weakening the magnetic field or fully nulling the magnetic field. Thus, some small amount of magnetic field may remain when in the null state, such as an amount sufficient to provide the low-force retention manner set forth above.

Figure 3:
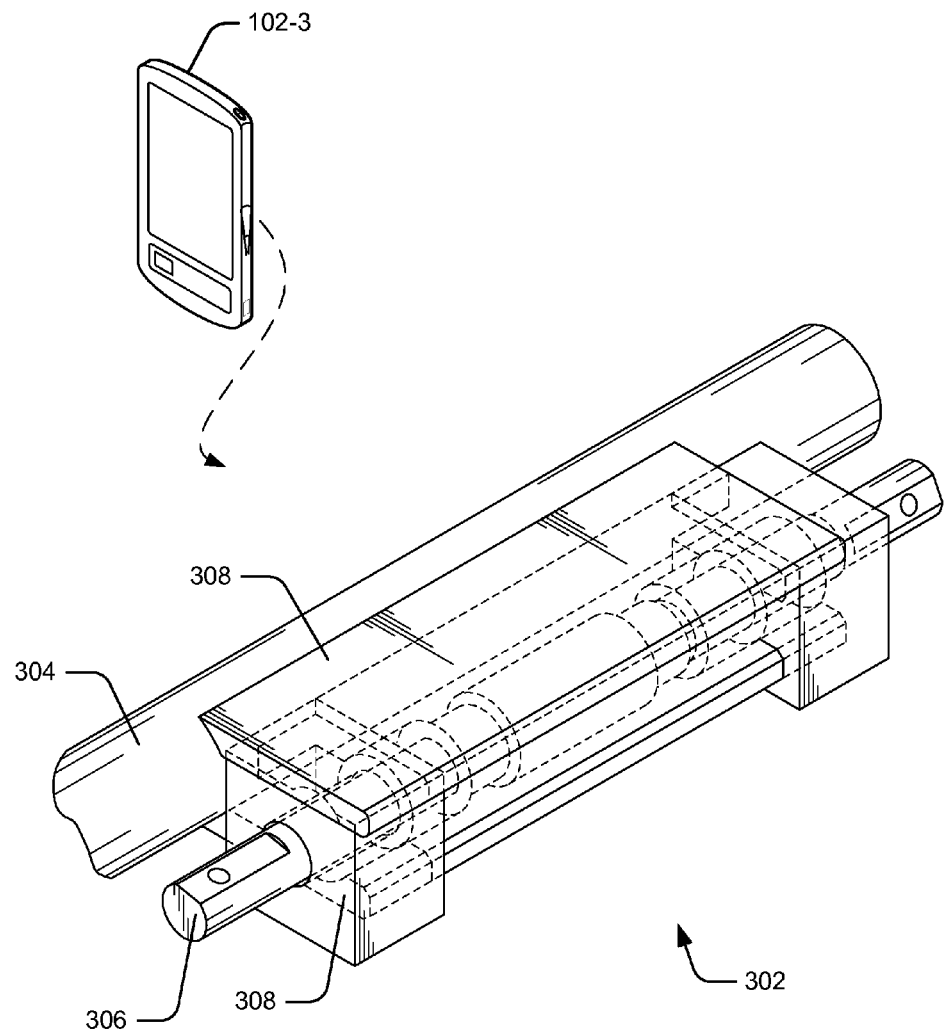
FIG. 3 is a detailed illustration of the switchable magnetic lock of the smart phone of FIG. 2.

As illustrated in detail in FIG. 3, smart phone 102-3 also includes a switchable magnetic lock 302, shown in the foreground for visual clarity. Switchable magnetic lock 302 is illustrated with a portion 304 of stylus 202 of FIG. 2, this portion 304 having a magnetically permeable material capable of completing a magnetic circuit. Switchable magnetic lock 302 includes a diametrically magnetized magnet 306 and magnetic-field directors 308 proximate diametrically magnetized magnet 306. Note that switchable magnetic lock 302 can include an actuator that is capable of rotating diametrically magnetized magnet 306 between a first position and a second position, the first position causing magnetic-field directors 308 to null the magnetic field and the second position causing magnetic-field directors 308 to direct the magnetic field to retention structure 204 and thus portion 304. Directing the magnetic field is described in greater detail below.

Portion 304 and its magnetically permeable material can be located in multiple parts of stylus 202. Thus, assume that two portions 304 are included within stylus 202. In such a case, a user may select to lock stylus 202 into retention structure 204 such that stylus 202 does not project from smart phone 102-3 or does project some amount from smart phone 102-3. Thus, multiple portions 304 within stylus 202 permit a user to select to lock stylus 202 flush with smart phone 102-3 or projecting from smart phone 102-3. The projecting end of stylus 202 may enable a user to more easily locate and remove stylus 202, especially if the user cannot see or does not wish to focus on smart phone 102-3 or stylus 202. The magnetically permeable material can vary in these portions 304, or controller 108 may determine which portion 304 is proximate magnetic field directors 308, effective to vary a holding force based on which portion 304, and thus the location of stylus 202 relative to smart phone 102-3.

Further, and as noted in part above, smart phone 102-3 includes controller 108 (not shown), which is capable of powering the actuator to rotate diametrically magnetized magnet 306. In so doing, the rotation acts to release stylus 202 by releasing the magnetically permeable material of portion 304 from retention structure 204 or locks the magnetically permeable material of portion 304 to retention structure 204, depending on the rotation.

Figure 4:
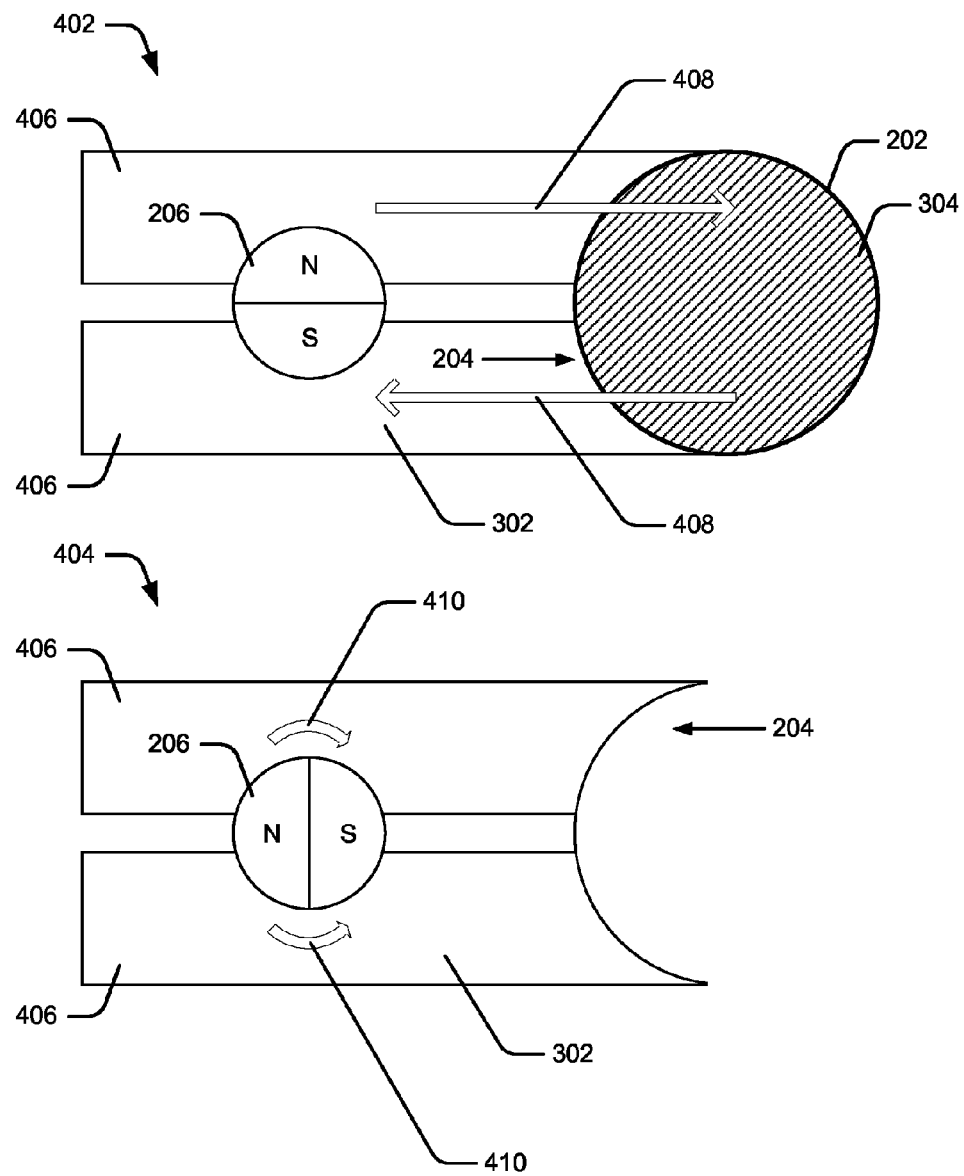
FIG. 4 illustrates simplified, cross-section views of the switchable magnetic lock in the smart phone of FIG. 2.

By way of further illustration, consider FIG. 4, which illustrates simplified, cross-section views 402 and 404 of switchable magnetic lock 302 sectioned across a long axis of diametrically magnetized magnet 306 and the length of stylus 202 (for cross-section view 402). Cross-section view 402 illustrates switchable magnetic lock 302 in a directed state, the directed state directing a magnetic field of diametrically magnetized magnet 306 toward retention structure 204 and thus portion 304 of stylus 202. This directed state locks stylus 202 to retention structure 204. Field directors 406 direct this magnetic field as shown at direction 408.

Cross-section view 404 illustrates switchable magnetic lock 302 in a null state, the null state nulling the magnetic field of diametrically magnetized magnet 306 through field directors 406 as shown at nulling directions 410. Directions and manners in which the magnetic field is nulled may vary, including through a magnetic circuit disparate (e.g., opposite) from stylus 202. In this null state, stylus 202 is released and therefore unlocked. Low-power permanent magnet 206 of FIG. 2 may hold stylus 202 to retention structure 204 with low power sufficient to prevent stylus 202 from falling off of smart phone 102-3 but enable a user to easily remove stylus 202. Note that diametrically magnetized magnet 306 is rotated about 90 degrees from the directed state shown in cross-section 402 to the null state shown in cross-section 404.

In this example of switchable magnetic lock 302 shown in FIG. 4, each of field directors 406 has an isolated magnetic circuit. This isolated magnetic circuit is capable of directing the magnetic field of diametrically magnetized magnet 306 in direction 408 and nulling direction 410 as shown in cross-sections 402 and 404, respectively.

Figure 5:
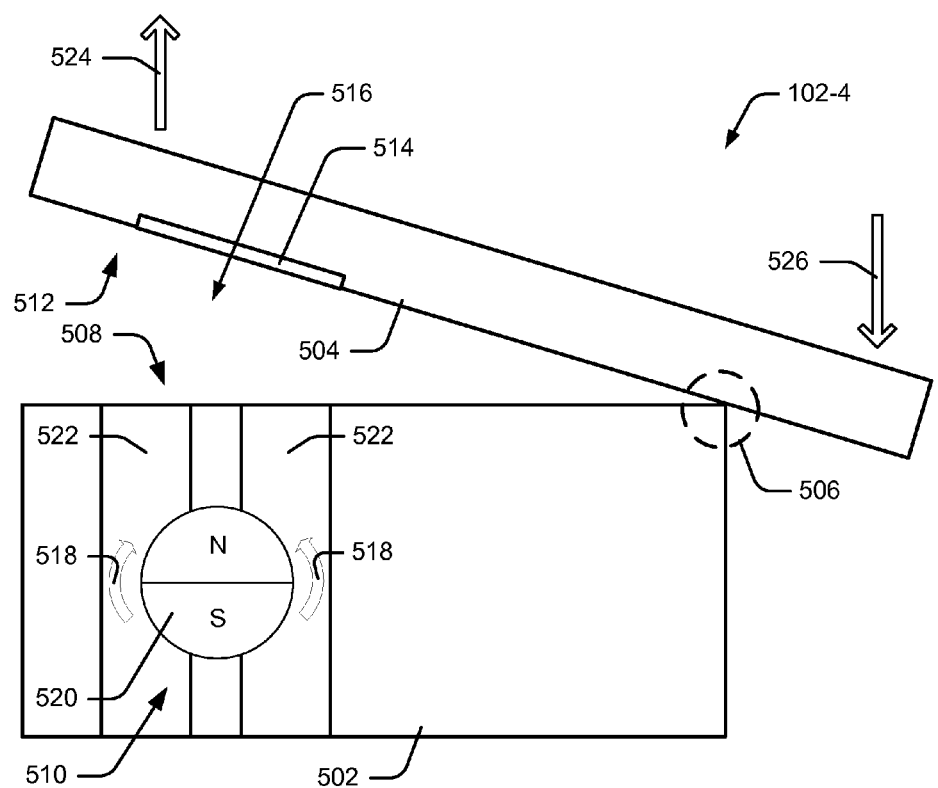
FIG. 5 illustrates the all-in-one computer of FIG. 1 where the switchable magnetic lock is in a null state.

FIG. 5 illustrates a simplified cross-section of all-in-one computer 102-4 of FIG. 1 in a null state. All-in-one computer 102-4 is illustrated with a base 502 and a display 504 connected through a hinge 506. Base 502 has a surface 508 and a switchable magnetic lock 510. Display 504 has a surface 512 and a magnetically permeable material 514. Note that while display 504 is illustrated with magnetically permeable material 514 and base 502 is illustrated with switchable magnetic lock 510, these may be reversed and still be effective to lock and unlock display 504 to and from base 502.

Switchable magnetic lock 510 is configured to switch being a lock state and an unlock state. In an unlock state 516, which is illustrated in FIG. 5 as space between surfaces, switchable magnetic lock 510 does not lock surface 508 to surface 512. This unlock state is created by a complete magnetic circuit, shown with magnetic field directions 518, which is effective to null a magnetic field of a permanent magnet 520 of switchable magnetic lock 510 using magnetic-field directors 522 and without using magnetically permeable material 514.

Hinge 506 is configured to rotate display 504 to and from base 502 and, when closed, contact surface 508 with surface 512. In some embodiments, hinge 506 is configured to include a spring, the spring causing display 504 to separate from surface 508 from surface 512 through a hinge force caused by the spring. This hinge force is insufficient to separate surface 508 and 512 when switchable magnetic lock 510 is in the lock state but is sufficient to separate surface 508 and 512 when in an unlock state. This hinge force is shown acting in two directions, an upward direction 524 and a downward direction 526.

Figure 6:
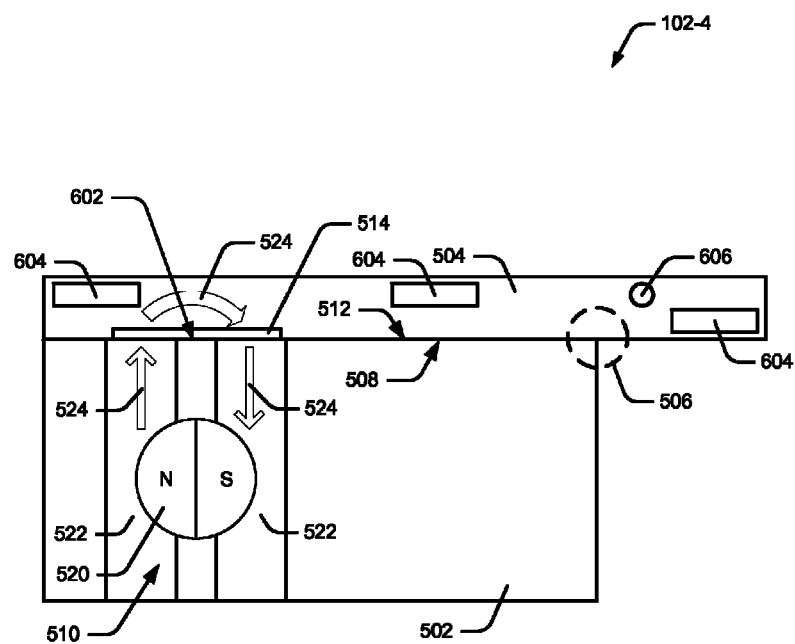
FIG. 6 illustrates the all-in-one computer of FIGS. 1 and 5 where the switchable magnetic lock is in an unlock state.

FIG. 6 illustrates a simplified cross-section of all-in-one computer 102-4 in a lock state 602. In this lock state 602, switchable magnetic lock 510 locks surface 508 to surface 512 by completing a magnetic circuit between permanent magnet 520 of switchable magnetic lock 510 and magnetically permeable material 514 using magnetic-field directors 522 when surface 508 and surface 512 are made proximate, such as through hinge 506. The directed magnetic field of this lock state 602 is shown with magnetic field directions 524.

Note that switchable magnetic lock 510 locks base 502 to display 504 without mechanical dents, detents, or latches. This switchable magnetic lock 510 may also do so without being visible at all, as the magnetic field may pass through a smooth, seamless surfaces (e.g., surfaces 508 and 512) on base 502 and display 504.

While not shown in FIGS. 5 and 6, locking and unlocking can be performed by a controller using an actuator, such as one or more of the above-noted example controllers and actuators. Thus, in a case where permanent magnet 520 is a diametrically magnetized magnet, a controller of switchable magnetic lock 510 may power an actuator to rotate the diametrically magnetized magnet between positions, such as a position shown in FIG. 5 resulting in a null state and another position as shown in FIG. 6 that directs the magnetic field to display 504 and will lock display 504 to base 502 when magnetically permeable material 514 is near to field directors 522. Likewise, the controller can power an actuator to release display 504.

In this powered example case, a controller can receive selections in the various manners set forth above. Thus, the controller may receive an indication that a user has touched one of capacitive sensors 604 or a button 606 on display 504, which may indicate that the user wishes to unlock switchable magnetic lock 510. Alternatively or additionally, the controller may sense that surface 508 and surface 512 are near to each other, such as through a proximity sensor or a sensor that determines when hinge 506 is closed or nearly closed. This indicates that switchable magnetic lock 510 should be switched to a lock state, and so forth.

In another embodiment of hinge 506, hinge 506 includes a counter-balance rather than the spring described above. This counter-balance enables substantially forceless separation of surface 508 from surface 512 when switchable magnetic lock 510 is in the unlock state. A controller of switchable magnetic lock 510 may sense that a user wishes to open all-in-one computer 102-4 and, responsive to that sensing, unlock display 504 from base 502. The counter-balance then enables a user to almost effortlessly move display 504 relative to base 502. This can be performed through implicit sensing, such as through a capacitive sensor or proximity sensor or explicitly through a raised button, voice command, and so forth.

These and other capabilities and configurations, as well as ways in which entities of FIGS. 1-6 act and interact, are set forth in greater detail below. These entities may be further divided, combined, and so on. The environment 100 of FIG. 1 and the detailed illustrations of FIGS. 2-6 illustrate some of many possible environments and devices capable of employing the described techniques.

Example Methods Using Switchable Magnetic Lock

Figure 7:
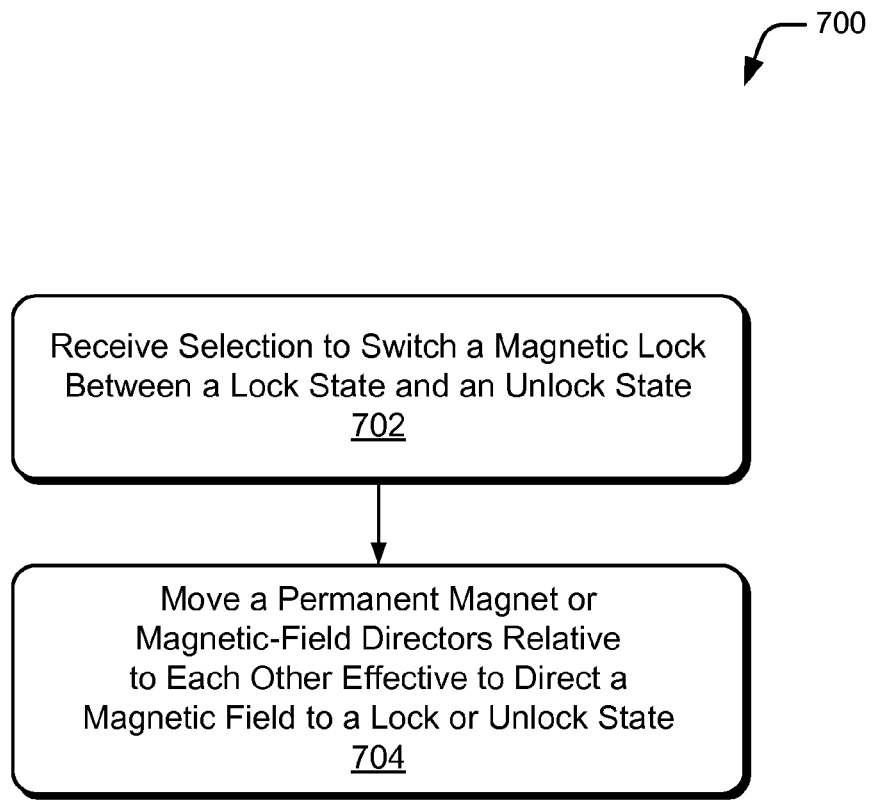
FIG. 7 illustrates example methods enabling use of a switchable magnetic lock.

FIG. 7 depicts methods 700 enabling use of a switchable magnetic lock. These methods are shown as sets of blocks that specify operations performed but are not necessarily limited to the order shown for performing the operations by the respective blocks. In portions of the following discussion reference may be made to environment 100 of FIG. 1 and entities detailed in FIGS. 2-6, reference to which is made for example only. The techniques are not limited to performance by one entity or multiple entities operating on one device.

Block 702 receives a selection to switch a magnetic lock between a lock state and an unlock state. This switchable magnetic lock can be embodied in one of the many manners set forth above, such as with a permanent magnet having a magnetic field and magnetic-field directors proximate the permanent magnet, each of the field directors configured to selectably direct a magnetic field of the permanent magnet, a first direction nulling the magnetic field to provide the unlock state and a second direction redirecting the magnetic field to provide the lock state. The selection received may be implicit or explicit, such as with one of the various sensing devices and manners set forth above.

Block 704, responsive to the selection, moves the permanent magnet relative to the magnetic-field directors or the magnetic-field directors relative to the permanent magnet effective to direct the magnetic field to a lock or unlock state. This moving of the permanent magnet or magnetic-field directors may be a rotation along a long axis of the permanent magnet. The moving can instead be a lateral movement relative to multiple sets of magnetic-field directors, such as by moving one set of magnetic-field directors that null the magnetic field proximate or distant the permanent magnet and distant or proximate another set directing the magnetic field to a magnetically permeable material. Various other movements based on other structures of permanent magnets and magnetic-field directors are also envisioned.

As noted above, the techniques permit locking and unlocking of devices, such as computing devices and peripherals, though other devices may be used. Further, the techniques permit this locking and unlocking seamlessly on devices and also permit, in some embodiments, implicit selection by a user. Methods 700 can be performed using the various controllers, sensors, and actuators noted herein (e.g., controller 108 based on data sensed by sensors 106 and by controlling actuator 114).

The preceding discussion describes methods relating to switchable magnetic locks, as well as other methods and techniques. Aspects of these methods may be implemented in hardware (e.g., fixed logic circuitry), firmware, software, manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing mode by multiple computing devices. Further, the features described herein are platform-independent and can be implemented on a variety of computing platforms having a variety of processors.

These techniques may be embodied on one or more of the entities shown in FIGS. 1-6 and 8 (device 800 is described below), which may be further divided, combined, and so on. Thus, these figures illustrate some of the many possible systems or apparatuses capable of employing the described techniques. The entities of these figures generally represent software, firmware, hardware, whole devices or networks, or a combination thereof. In the case of a software implementation, for instance, the entities (e.g., controller 108) represent program code that performs specified tasks when executed on a processor (e.g., processor(s) 118). The program code can be stored in one or more computer-readable memory devices, such as media 116 or computer-readable media 814 of FIG. 8.

Example Device

Figure 8:
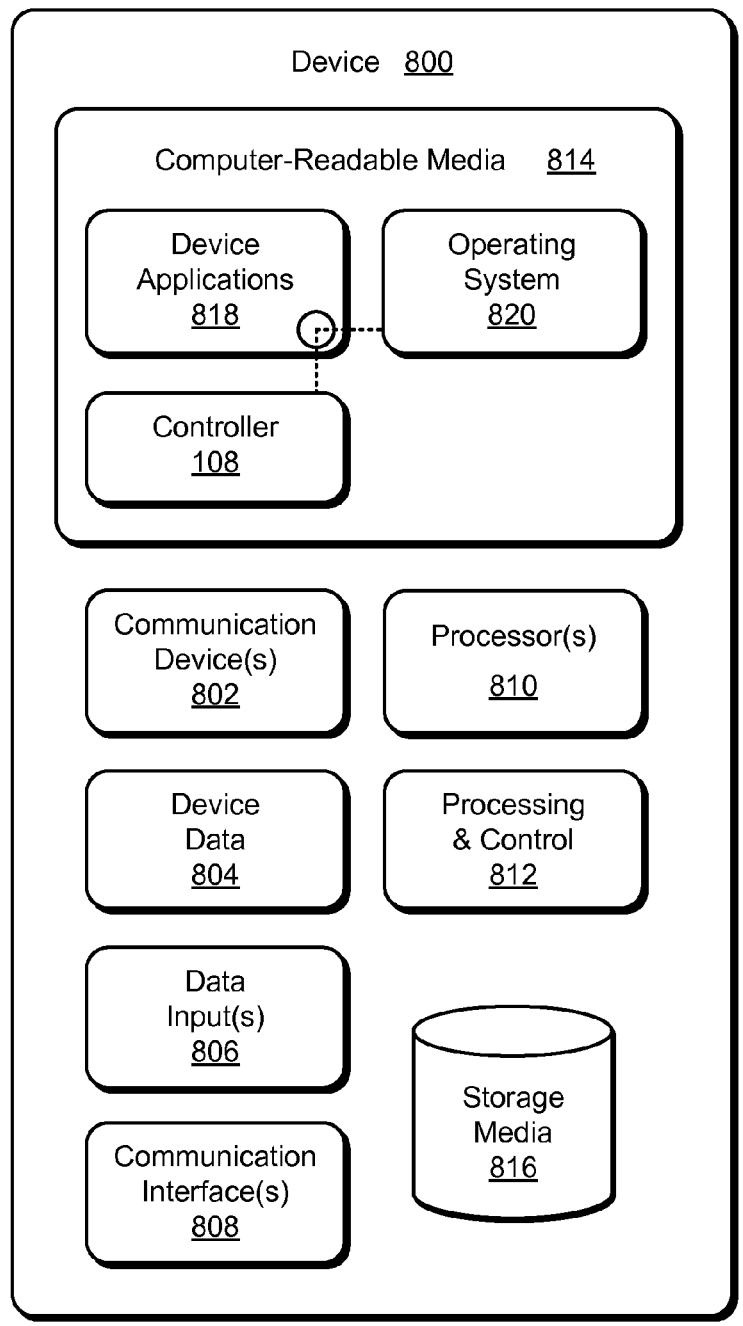
FIG. 8 illustrates an example device in which techniques enabling use of switchable magnetic locks can be implemented.

FIG. 8 illustrates various components of example device 800 that can be implemented as any type of client, server, and/or computing device as described with reference to the previous FIGS. 1-7 to implement techniques enabling switchable magnetic locks. In embodiments, device 800 can be implemented as one or a combination of a wired and/or wireless device, as a form of television mobile computing device (e.g., television set-top box, digital video recorder (DVR), etc.), consumer device, computer device, server device, portable computer device, user device, communication device, video processing and/or rendering device, appliance device, gaming device, electronic device, System-on-Chip (SoC), and/or as another type of device or portion thereof. Device 800 may also be associated with a user (e.g., a person) and/or an entity that operates the device such that a device describes logical devices that include users, software, firmware, and/or a combination of devices.

Device 800 includes communication devices 802 that enable wired and/or wireless communication of device data 804 (e.g., received data, data that is being received, data scheduled for broadcast, data packets of the data, etc.). Device data 804 or other device content can include configuration settings of the device, media content stored on the device, and/or information associated with a user of the device. Media content stored on device 800 can include any type of audio, video, and/or image data. Device 800 includes one or more data inputs 806 via which any type of data, media content, and/or inputs can be received, such as human utterances, user-selectable inputs (explicit or implicit), messages, music, television media content, recorded video content, and any other type of audio, video, and/or image data received from any content and/or data source.

Device 800 also includes communication interfaces 808, which can be implemented as any one or more of a serial and/or parallel interface, a wireless interface, any type of network interface, a modem, and as any other type of communication interface. Communication interfaces 808 provide a connection and/or communication links between device 800 and a communication network by which other electronic, computing, and communication devices communicate data with device 800.

Device 800 includes one or more processors 810 (e.g., any of microprocessors, controllers, and the like), which process various computer-executable instructions to control the operation of device 800 and to enable techniques for switchable magnetic locks. Alternatively or in addition, device 800 can be implemented with any one or combination of hardware, firmware, or fixed logic circuitry that is implemented in connection with processing and control circuits which are generally identified at 812. Although not shown, device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 800 also includes computer-readable storage media 814, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 800 can also include a mass storage media device 816.

Computer-readable storage media 814 provides data storage mechanisms to store device data 804, as well as various device applications 818 and any other types of information and/or data related to operational aspects of device 800. For example, an operating system 820 can be maintained as a computer application with computer-readable storage media 814 and executed on processors 810. Device applications 818 may include a device manager, such as any form of a control application, software application, signal-processing and control module, code that is native to a particular device, a hardware abstraction layer for a particular device, and so on.

Device applications 818 also include any system components, engines, or modules to implement techniques enabling switchable magnetic locks. In this example, device applications 818 include controller 108.

CONCLUSION

Although embodiments of techniques using, and apparatuses including, switchable magnetic locks have been described in language specific to features and/or methods, it is to be understood that the subject of the appended claims is not necessarily limited to the specific features or methods described. Rather, the specific features and methods are disclosed as example implementations of switchable magnetic locks.

What is claimed is:

1. An apparatus comprising:
a retention structure;
a diametrically magnetized magnet having a magnetic field;
magnetic-field directors proximate the diametrically magnetized magnet and the retention structure;
an actuator capable of rotating the diametrically magnetized magnet between a first position and a second position, the first position causing the magnetic-field directors to null or substantially weaken the magnetic field and the second position causing the magnetic-field directors to direct the magnetic field to the retention structure; and
a controller capable of powering the actuator to rotate the diametrically magnetized magnet between the first position and the second position, the rotation capable of releasing a device having a magnetically permeable material from the retention structure or locking the device having the magnetically permeable material to the retention structure.

2. An apparatus as described in claim 1, wherein the apparatus is capable of maintaining a lock of the device having the magnetically permeable material to the retention structure without using power.

3. An apparatus as described in claim 1, wherein the controller is further capable of receiving a selection, the selection to lock or unlock the device having the magnetically permeable material, and, responsive to the selection, powering the actuator.

4. An apparatus as described in claim 3, further comprising a capacitive sensor, the capacitive sensor capable of sensing contact of a user touching the device having the magnetically permeable material, and wherein the selection is receivable from the capacitive sensor and the controller is capable of powering the actuator effective to release the magnetically permeable material responsive to the selection.

5. An apparatus as described in claim 3, further comprising a magnetic load sensor capable of sensing a proximity of the device having the magnetically permeable material, and wherein the selection is receivable from the magnetic load sensor and the controller is capable of powering the actuator effective to lock the device having the magnetically permeable material to the retention structure responsive to the selection.

6. An apparatus as described in claim 1, further comprising a permanent magnet proximate to, or within, the retention structure, the permanent magnet providing a second magnetic field having a power substantially less than a power of the magnetic field of the diametrically magnetized magnet.

7. An apparatus as described in claim 1, wherein each of the field directors has an isolated magnetic circuit, the isolated magnetic circuits capable of directing the magnetic field of the diametrically magnetized magnet in a first direction nulling the magnetic field when in the first position and a second direction directing the magnetic field to the retention structure when in the second position.

8. An apparatus as described in claim 1, wherein the diametrically magnetized magnet has a long axis, the diametrically magnetized magnet diametrically magnetized along the long axis and polarized perpendicular to the long axis.

* * * * *